United States Patent [19]
Shimodaira et al.

[11] 3,882,735
[45] May 13, 1975

[54] DEVICE FOR ROTATING RECIPROCALLY

[75] Inventors: Tadayoshi Shimodaira; Kazuto Tamai, both of Matsumoto, Japan

[73] Assignees: Kabushiki Kaisha Suwa Seikosha, Tokyo; Shinshu Seiki Kabushiki Kaisha, Nagano, both of Japan

[22] Filed: Nov. 20, 1973

[21] Appl. No.: 417,661

[30] Foreign Application Priority Data
Nov. 20, 1972 Japan.............................. 47-115619

[52] U.S. Cl. .................... 74/435; 74/109; 101/110
[51] Int. Cl. .......................................... F16h 55/04
[58] Field of Search ............ 74/437, 112, 109, 436, 74/435; 101/110

[56] References Cited
UNITED STATES PATENTS

| | | |
|---|---|---|
| 195,638 | 9/1877 | Nichols................................ 74/437 |
| 223,806 | 1/1880 | Hodges................................. 74/437 |
| 2,359,580 | 10/1944 | Poole.................................... 74/435 |
| 2,679,357 | 5/1954 | Rosenberger........................ 74/435 |
| 2,715,998 | 8/1955 | Stanley ................................ 101/110 |
| 3,218,966 | 11/1965 | Petit...................................... 74/437 |
| 3,779,091 | 12/1973 | Inoue.................................... 74/109 |

Primary Examiner—Wesley S. Ratliff, Jr.
Attorney, Agent, or Firm—Blum Moscovitz Friedman & Kaplan

[57] ABSTRACT

A device for converting rotation in a single direction into reciprocating rotation comprises meshing sector gears and biasing means for rotating a driven gear in a direction opposite to that in which it is driven by a driving gear, said rotation in said opposite direction occurring when the untoothed portion of the driving gear is proximate said driven gear.

5 Claims, 5 Drawing Figures

DEVICE FOR ROTATING RECIPROCALLY

BACKGROUND OF THE INVENTION

In mechanical design it may become necessary to use the rotation of a wheel where said rotation occurs in only one direction to drive a second wheel in such a way that it can be moved from a rest position through a given angle and finally brought back to its rest position. More generally, it may be desirable to use the rotation of a wheel in a single direction to generate alternating rotations in opposite directions in a second wheel. Such conditions arise in the design of flying printers having a plurality of character rings. The problem becomes particularly acute when the conditions are such that the device must be compact, reliable and as inexpensive as possible to construct and operate. Where it is necessary that the angle through which the driven wheel is rotated must be controlled with great precision, and where it is necessary that this precision be maintained for an extended period of life, then the problem becomes even more severe.

Control of the degree of rotation has previously been obtained by means of cams used in combination with sector gears. However, wear of the cams and of the portions of the sector gear activated by said cams results after a relatively short time in a loss of the precision necessary in devices such as flying printers. Consequently, there is a need for compact, reliable and relatively inexpensive devices as indicated above but to these requirements must be added that of maintaining precision throughout an extended life, else such a machine cannot be considered competitive.

SUMMARY OF THE INVENTION

A driving wheel is mounted on a shaft for rotation therewith in a single direction. The driving wheel has gear teeth cut into a portion of the periphery thereof. At least a portion of the remainder of said driving wheel has a radius equal to the lands at the bottom of the gear teeth. A second shaft has a driven wheel mounted thereon, the driven wheel having portions of its periphery cut into gear teeth, the remainder of the periphery of said driven wheel having a radius euqal to that of the bottom lands of the gear teeth. The shafts and gears are so mounted that the gear teeth can mesh with each other. A further component of the device is a spring so engaged with the driven wheel that it resists the rotation of the driven wheel when the gear teeth of the two wheels are meshed. When the portion of the driving wheel which has a radius equal to the bottom land of its gear teeth comes into opposition with the driven wheel, the driven wheel is no longer under the thrust of the driving wheel and it then returns to its rest position under the influence of the spring.

The driving wheel may also have a cam portion whose radius is equal to the radius of the top lands of the gear teeth on said wheel. The cam portion is so located with respect to the gear teeth on the driven wheel that it follows in direct sequence after the gear teeth, as a result of which the driven wheel can be maintained in its most displaced position for a preselected time until the smaller radius portion of the driving wheel comes into opposition with the gear teeth on the driven wheel.

For use in a device such as a flying printer, the driving wheel can be halted in any selected position during the stage when the gear teeth of both wheels are meshed. Further, the shaft carrying the driven wheel carries at least one wheel having characters on the edge thereof, said characters being suitable for printing in a flying printer. Halting the driving wheel in a given position brings a desired character into accurate registry for printing said character.

Accordingly, an object of the present invention is an improved device for converting rotation in one direction into reciprocal rotation.

Another object of the present invention is a device in which a first rotating wheel can bring a second rotating wheel into a specified position after which said second wheel rotates in the opposite direction to return to its rest position.

A further object of the present invention is an improved device wherein rotation in a first direction is used for bringing a character into a specified position for printing said character.

Yet another object of the present invention is an improved device for bringing characters into registry for printing where said device is compact, economical to construct and operate and maintains high precision throughout an extended life.

Still other objects and advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
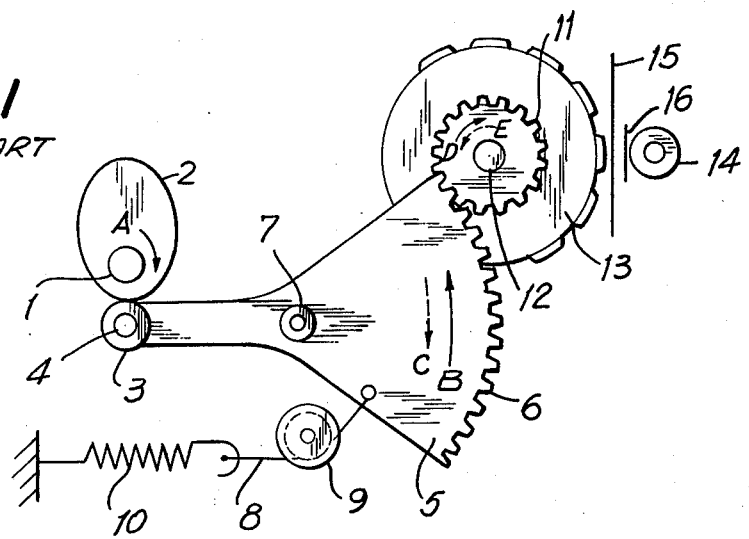
FIG. 1 is a device in accordance with the prior art.

A device in accordance with the prior art, said device being used for converting rotation in a single direction into reciprocating direction is shown in FIG. 1. The device of FIG. 1 is particularly designed for bringing a specific character on the periphery of a wheel into positioning for printing in a flying printer. In the device of FIG. 1 drive shaft 1 has mounted thereon cam 2 for rotating in a single direction. Cam 2 makes contact with roller 3 mounted on shaft 4 of sector lever 5. Sector lever 5 has gear teeth 6 on the end opposite from shaft 4. Sector lever 5 swivels about shaft 7. Wire 8 is fixed at one end to sector lever 5 and at the other end to spring 10. Pulley 9 serves for changing the direction of wire 8.

As is evident, rotation of cam 2 in the direction indicated by the arrow A first causes counterclockwise rotation of sector 5 against the pull of spring 10 through wire 8. As rotation of cam A proceeds past a displacement of 180° sector gear 5 returns to its original position. Sector gear 5 meshes with wheel 11 which is mounted on shaft 12. Character wheel 13 is also mounted on shaft 12 for rotation therewith. Where the device is used in a flying printer, 14 is a hammer facing character ring 13 with print paper 15 and inked ribbon 16 therebetween.

As aforenoted, rotation of cam 2 in the direction of arrow A causes sector lever 5 to rotate in the direction indicated by arrow B, which in turn causes wheel 11 to rotate in the direction D. Rotation of cam 2 past the 180° position causes clockwise rotation of sector lever 5 in the direction indicated by the dashed arrow C and counterclockwise rotation of wheel 11 in the direction indicated by the dashed arrow E.

When a character is to be printed, the rotation of cam A is stopped at an angular position such that a character on the periphery of wheel 13 is opposed to hammer 14. Hammer 14 is then actuated and printing is performed. In general, there will be a plurality of character rings 13 mounted on shaft 12 for rotation therewith, each of said rings being opposed by a printing hammer 14.

As aforenoted, the conventional device is complicated, there are a large number of parts and the space required for the system is large. Furthermore, positioning of the character wheel angularly must be carried out with high precision if the characters to be printed are to be spaced properly. However, even relatively slight wear of cam 2 or roller 3 reduces the precision with which the character rings 13 are positioned, so that the device has a relatively short life with respect to acceptable output.

Figure 2:
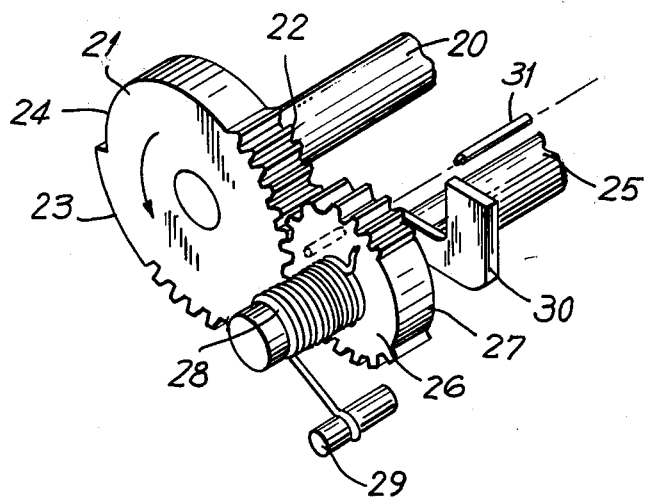
FIG. 2 is a perspective view in partly exploded form of a device in accordance with the present invention.
Figure 3:
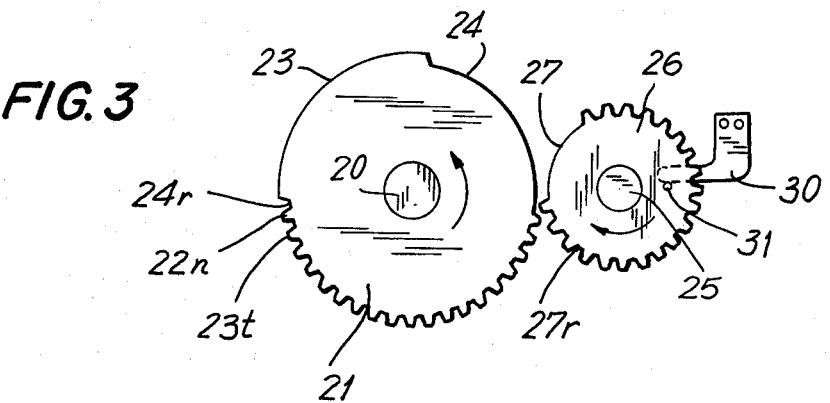
FIG. 3 shows schematically an end view of the embodiment of FIG. 2 where the relative positions of the two wheels are such that displacement of a driven gear is about to occur.

An embodiment of the present invention is shown in FIG. 2. Drive shaft 20 has mounted thereon driving wheel 21 for rotation therewith, and drive shaft 20 is rotated in a single direction as indicated by the arrow on the face of drive wheel 21. Drive wheel 21 is provided on its periphery with gear teeth 22, a cam portion 23 and a portion 24, the radius of which is no greater than the radius of bottom lands 24r (FIG. 3). Driven wheel 26 has gear teeth on one section of the periphery thereof, and the remainder of the periphery of said driven wheel has a radius which is no greater than that of the bottom lands 27r (FIG. 3). Driven wheel 26 is mounted on driven shaft 25 for rotation therewith.

When the gear teeth on the two wheels are meshed, driven wheel 26 rotates in clockwise direction against the urging of a spring, preferably a torsion coil spring such as 28 (FIG. 2) one end of which is fixed in driven wheel 26 and the other end of which is fixed to a stationary part of the apparatus which includes the device of the present invention. Wheel 26 also carries a pin 31 protruding from the surface thereof and so disposed that it can come in contact with a stationary stop. Stop pin 31 mounted on the further side of driven wheel 26 and stop 30 determine the rest position of driven wheel 26 when the gear teeth on the two wheels are not meshed.

Figure 4:
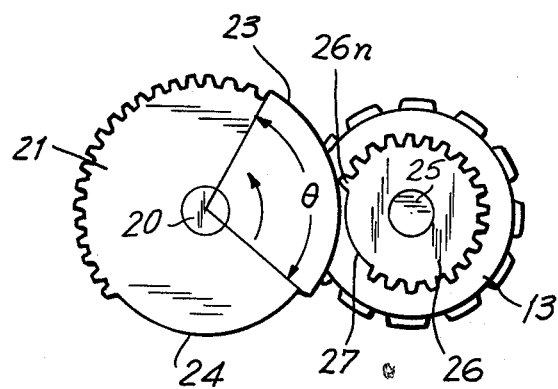
FIG. 4 shows the embodiment of FIG. 3 in which the driven gear has undergone maximum displacement and it is being held at maximum displacement.
Figure 5:
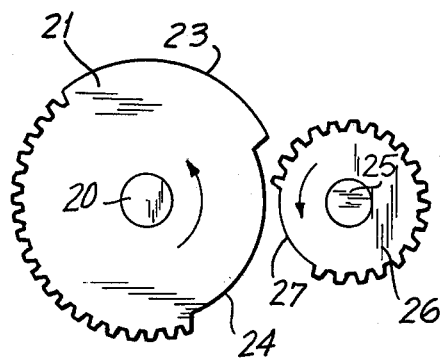
FIG. 5 shows the relationship of the two gears under conditions such that the driven gear can return to its rest position, rotating in a direction opposite to that in which it was first displaced from its rest position.

The action of the device can be seen from examination of FIGS. 3, 4 and 5. In FIG. 3, gear teeth 22 are about to engage the toothed portion of drive wheel 26. Driven wheel 26 is in its rest position with stopping pin 31 making contact with stop 30 under the urging of spring 28 (FIG. 2).

As represented in FIG. 4, the toothed portion of driving wheel 22 has passed last tooth 26n of driven wheel 26. Cam portion 23 subtends the angle $\theta$ of driving wheel 21; while cam portion 23 of driving wheel 21 remains in contact with tooth 26n, driven wheel 26 is rotated to its maximum displacement from its rest position. FIG. 4 also shows a portion of character wheel 13.

As driving wheel 21 continues its rotation, cam portion 23 thereof finally passes beyond tooth 26n. Portion 24 of the periphery of driving wheel 21 then comes into opposition with tooth 26n. However, since the radius of portion 24 is no greater than the radius of bottom land 24r, driven wheel 26 under the urging of spring 28 snaps back into rest position as shown by the arrow in FIG. 5.

Where the device of the present invention is part of a flying printer, one or more character rings or wheels may be disposed on shaft 25 for rotation therewith. The system is compact and, moreover, since the positioning of the character wheels is determined by the positioning of a gear sector, namely that on driving wheel 21, in contact with a second gear sector, namely that on driven wheel 26, the wear over an extended life period is much less than the wear experienced when using a cam as in the prior art. Moreover, both gear sectors may be hardened. Consequently, the life of the system is much greater than that of the prior art devices.

It should be noted that the sequence consisting of gear teeth 22, cam portion 23 and depressed portion 24 of driving wheel 21 and the direction of rotation of drive shaft 20 are such that the portions of driving wheel 21 which are opposed to driven wheel 26 are in the order as stated at the beginning of this sentence. Further, when the angle $\theta$ which cam portion 23 subtends at the axis of drive shaft 20 is greater than 0, driven gear 26 goes through a sequence in which it is first rotated from its rest position in a clockwise direction, then held for a period of time at its maximum displacement and finally allowed to return quickly to its rest position. Where the angle $\theta$ which is subtended by cam portion 23 is equal to 0, then the sequence followed by driven wheel 26 is rotation in a clockwise direction at a rate dependent on the relative sizes of the two wheels and the rate of rotation of shaft 20. Then, as driven wheel 26 reaches its maximum displacement, it is immediately snapped back to its rest position by spring 28.

It should be noted that the device of the present invention would also function satisfactorily if the direction of rotation of shaft 20 were clockwise rather than counterclockwise and the sequence of gear teeth, depressed section 24 and cam section were reversed.

It will thus be seen that the objects set forth above, among those made apparent from the preceding description, are efficiently attained, and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statement of the scope of the invention, which, as a matter of language, might be said to fall therebetween.

What is claimed is:

1. A device for translating unidirectional rotation into reciprocal motion comprising a unidirectionally rotatable first shaft, a driving wheel mounted on said first shaft and rotatable therewith, said driving wheel having a periphery including a plurality of gear teeth provided in a first portion thereof, said gear teeth having substantially equi-height top and bottom lands, a cam provided in a second portion thereof adjacent said first portion, said cam radially extending on said driving wheel periphery, said second portion of said driving wheel having a radius which extends substantially to said top lands of said first portion, and a third portion between said first and second portions and contiguous therewith having a radius which extends no longer than to said bottom lands provided in said first portion, a second shaft, a driven wheel mounted on said second shaft for rotation therewith and having a plurality of gear teeth provided in a continuous portion of the periphery thereof, said gear teeth on said second wheel being substantially complementary with said gear teeth provided in said driving wheel said first and second shafts being in spaced relationship, one to the other, said driving wheel and said driven wheel being respectively aligned thereon for meshing engagement of respective gear teeth provided therein so as to permit said driving wheel to rotate said driven wheel in a first direction, said gear teeth provided in said driven wheel defining a concomitant plurality of top and bottom lands therein, said driven wheel having a remaining peripheral sector having a radius which extends no farther than said bottom lands provided in said continuous portion thereof, and a biasing means connected to said driven wheel for rotatably biasing said driven wheel in a direction opposite to that in which said driven wheel is driven by said driving wheel.

2. The device as claimed in claim 1 wherein said device further includes a stationary stopping means, and a pin mounted on said driven wheel, said pin being arranged thereon to contact said stopping means and for thereby establishing a rest position for said driven wheel.

3. The device as defined in claim 1, wherein at least one wheel having characters on the periphery thereof is mounted on said second shaft for reciprocal rotation therewith, said characters being of the type suitable for use in a flying printer.

4. The device as defined in claim 3 including means for stopping said driving wheel at a chosen position for bringing a selected character into a printing position.

5. The device as defined in claim 1, wherein said second portion of said driving wheel has an angle subtended thereby substantially equal to zero, said driven wheel thereby oscillating continuously as said driving wheel is rotated continuously.

* * * * *